US012764807B2

(12) United States Patent
De Foy et al.

(10) Patent No.: US 12,764,807 B2
(45) Date of Patent: Oct. 13, 2026

(54) METHODS, APPARATUSES AND SYSTEMS DIRECTED TO PROVISIONING DOMAIN SUPPORT IN 5G NETWORKS

(71) Applicant: InterDigital Patent Holdings, Inc., Wilmington, DE (US)

(72) Inventors: Xavier De Foy, Kirkland, WA (US); Ulises Olvera-Hernandez, Saint-Lazare (CA); Saad Ahmad, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 582 days.

(21) Appl. No.: 17/924,772

(22) PCT Filed: May 5, 2021

(86) PCT No.: PCT/US2021/030818
§ 371 (c)(1),
(2) Date: Nov. 11, 2022

(87) PCT Pub. No.: WO2021/231145
PCT Pub. Date: Nov. 18, 2021

(65) Prior Publication Data

US 2023/0379985 A1 Nov. 23, 2023

Related U.S. Application Data

(60) Provisional application No. 63/024,080, filed on May 13, 2020.

(51) Int. Cl.

| | |
|---|---|
| ***H04W 76/11*** | (2018.01) |
| ***H04L 61/4511*** | (2022.01) |
| ***H04L 101/677*** | (2022.01) |

(52) U.S. Cl.
CPC ......... *H04W 76/11* (2018.02); *H04L 61/4511* (2022.05); *H04L 2101/677* (2022.05)

(58) Field of Classification Search
CPC ................ H04W 76/11; H04L 61/4511; H04L 2101/677

(Continued)

(56) References Cited

U.S. PATENT DOCUMENTS

2023/0379985 A1 * 11/2023 De Foy ................... H04W 8/20
2024/0155532 A1 * 5/2024 Wang .................... H04W 60/00

OTHER PUBLICATIONS

Service discovery and selection of 5gLAN services using provisioning domains (Year: 2018).*

(Continued)

*Primary Examiner* — Hermon Asres
(74) *Attorney, Agent, or Firm* — VOLPE KOENIG

(57) ABSTRACT

Methods, apparatuses, systems, etc., directed to support provisioning domains (PvDs) in 5G networks are disclosed herein. In an embodiment, a network entity running a policy control function (PCF), may send to a wireless receive and transmit unit (WTRU) at least one WTRU route selection policy (URSP) rule associated with, for example, PvD descriptors. For example, URSP rules may be configured e.g., as part of the subscription profile and PvD descriptors may be configured e.g., as part of a network-wide configuration. An application function (AF) may use a network exposure function (NEF) application programming interface (API) to access and, for example, update, e.g. through any of NEF and PCF, any of URSP rules and PvD descriptors. According to embodiments, a WTRU may participate in a data network access identifier (DNAI) selection by including a PvD ID in, for example, PDU session establishment messages.

16 Claims, 10 Drawing Sheets

(58) Field of Classification Search
USPC .......................................................... 370/329
See application file for complete search history.

(56) References Cited

OTHER PUBLICATIONS

Anipko D et al "Multiple Provisioning Domain Architecture", Internet Engineering Task Force (IETF), Request for Comments: #7556, Category : Informational, ISSN: 2070-1721, Jun. 2015, 25 pages.
Anonymous, "Service Discovery and Selection of 5GLAN Services using Provisioning Domains", 3rd Generation Partnership Project (3GPP), SA WG2 Meeting #129bis, Document: S2-1812424, Nov. 26, 2018, 10 pages.
Pfister et al., Discovering Provisioning Domain Names and Data—Draft ietf intrea provisioning domains 11, Internet Engineering Task Force (IETF), Network Working Group, Internet Draft, Intended Status : Standards Track, Jan. 31, 2020, 33 pages.
Trammell et al., "An Abstract Application Layer Interface to Transport Services—draft-ietf-taps-interface-05", Internet Engineering Task Force (IETF), TAPS Working Group, Internet-Draft, Intended Status : Standards Track, Nov. 4, 2019, 64 pages.
Shao et al., "Multi-PvD Development Environment", Open Source : GitHub—IPv6-mPvD/pvd-dev, Jul. 16, 2018, URL: https://github.com/IPv6-mPvD/pvd-dev , 16 pages.
Anonymous, "Technical Specification Group Services and System Aspects; Study on enhancement of support for Edge Computing in 5G Core network (5GC)", 3rd Generation Partnership Project (3GPP), (Release 17), Document: 3GPP TR 23.748 V0.3.3, Jan. 2020, 40 pages.
Anonymous, "Update to Solution 1 in TR 23.758 Provisioning URSP configuration to the UE to establish POU Sessions for edge applications", 3rd Generation Partnership Project (3GPP), SA WG2 Meeting #139-e, Document: S2-2004409, Jun. 13, 2020, 4 pages.

* cited by examiner

```
{
    "name": "Edge Cloud provider.com",
    "localizedName": "Edge Cloud provider.com, Montreal, CA, H3A 3G4",
    "expires": "2020-03-06T10:00:00Z",
    "prefixes" : ["2001:db8:1::/48", "2001:db8:4::/48"],
    "dnsZones": "['example.com','sub.example.org']"
    "characteristics": {
        "maxThroughput": { "down":100000, "up": 50000 },
        "minLatency": { "down": 0.5, "up": 1 }
}
```

FIG. 2A

```
{
    "noInternet" : "true",
    "metered" : "true",
    "captivePortalURL" : "https://example.com/captive.html"
}
```

FIG. 2B

METHODS, APPARATUSES AND SYSTEMS DIRECTED TO PROVISIONING DOMAIN SUPPORT IN 5G NETWORKS

CROSS REFERENCE TO RELATED APPLICATIONS

This application is a U.S. National Stage Application under 35 U.S.C. 371 of International Patent Application No. PCT/US2021/030818, filed May 5, 2021, which is incorporated herein by reference in its entirety.

This application claims the benefit of U.S. Provisional Patent Application No. 63/024,080, filed May 13, 2020, which is incorporated herein by reference.

BACKGROUND

The present disclosure relates to network communications, including, but not exclusively, to methods, apparatuses, systems, etc. directed to domain provisioning support in 5G networks.

SUMMARY

Methods, apparatuses, systems, etc., directed to support provisioning domains (PvDs) in 5G networks are disclosed herein. In an embodiment, a network entity running a policy control function (PCF), may send to a wireless receive and transmit unit (WTRU) at least one WTRU route selection policy (URSP) rule associated with, for example, PvD descriptors. For example, URSP rules may be configured e.g., as part of the subscription profile and PvD descriptors may be configured e.g., as part of a network-wide configuration. An application function (AF) may use a network exposure function (NEF) application programming interface (API) to access and, for example, update, e.g. through any of NEF and PCF, any of URSP rules and PvD descriptors. According to embodiments, a WTRU may participate in a data network access identifier (DNAI) selection by including a PvD ID in, for example, PDU session establishment messages.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

FIG. 2A and FIG. 2B are two of JavaScript object notation (JSON) objects representing PvD attributes;

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
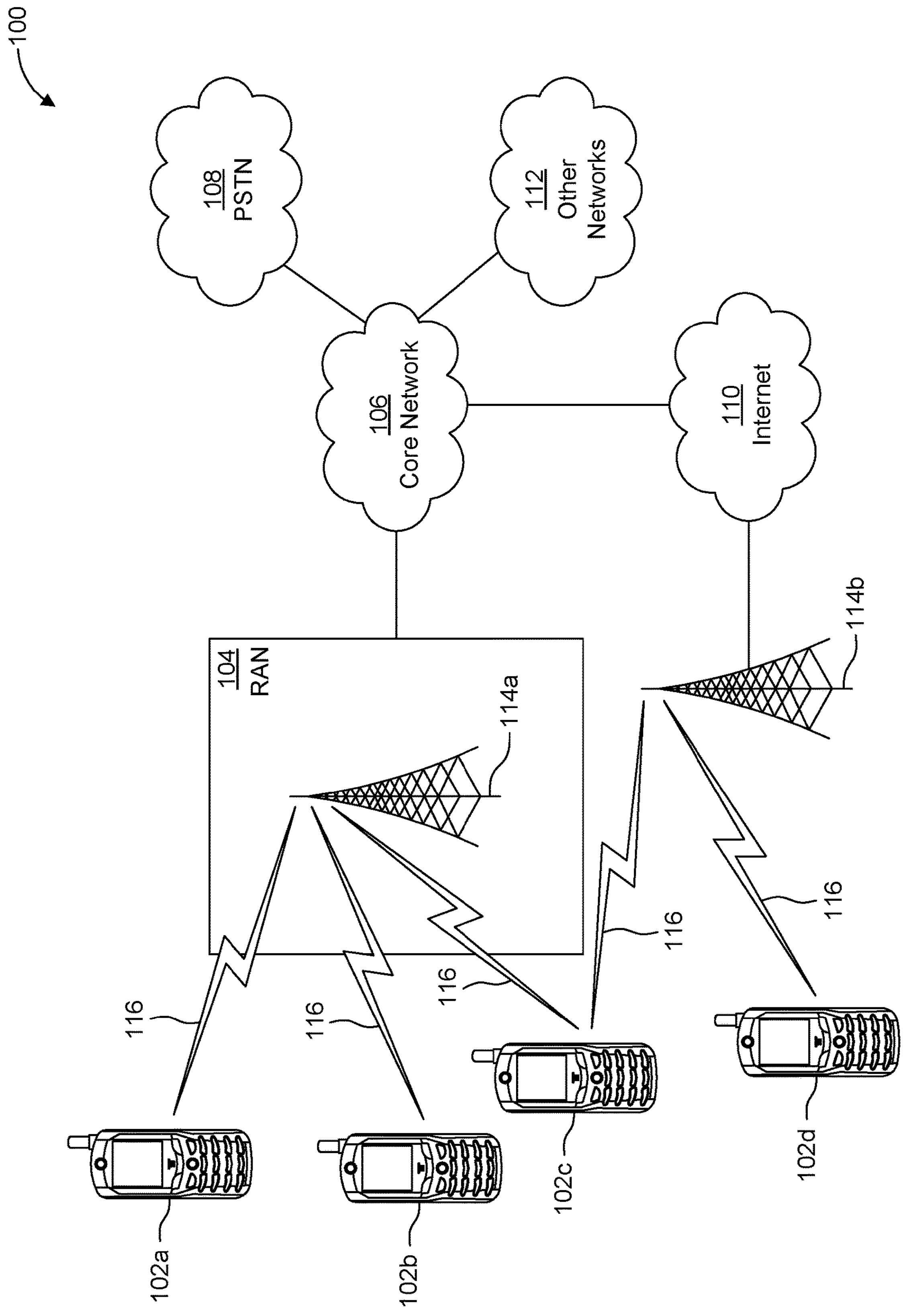
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or an "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, an NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
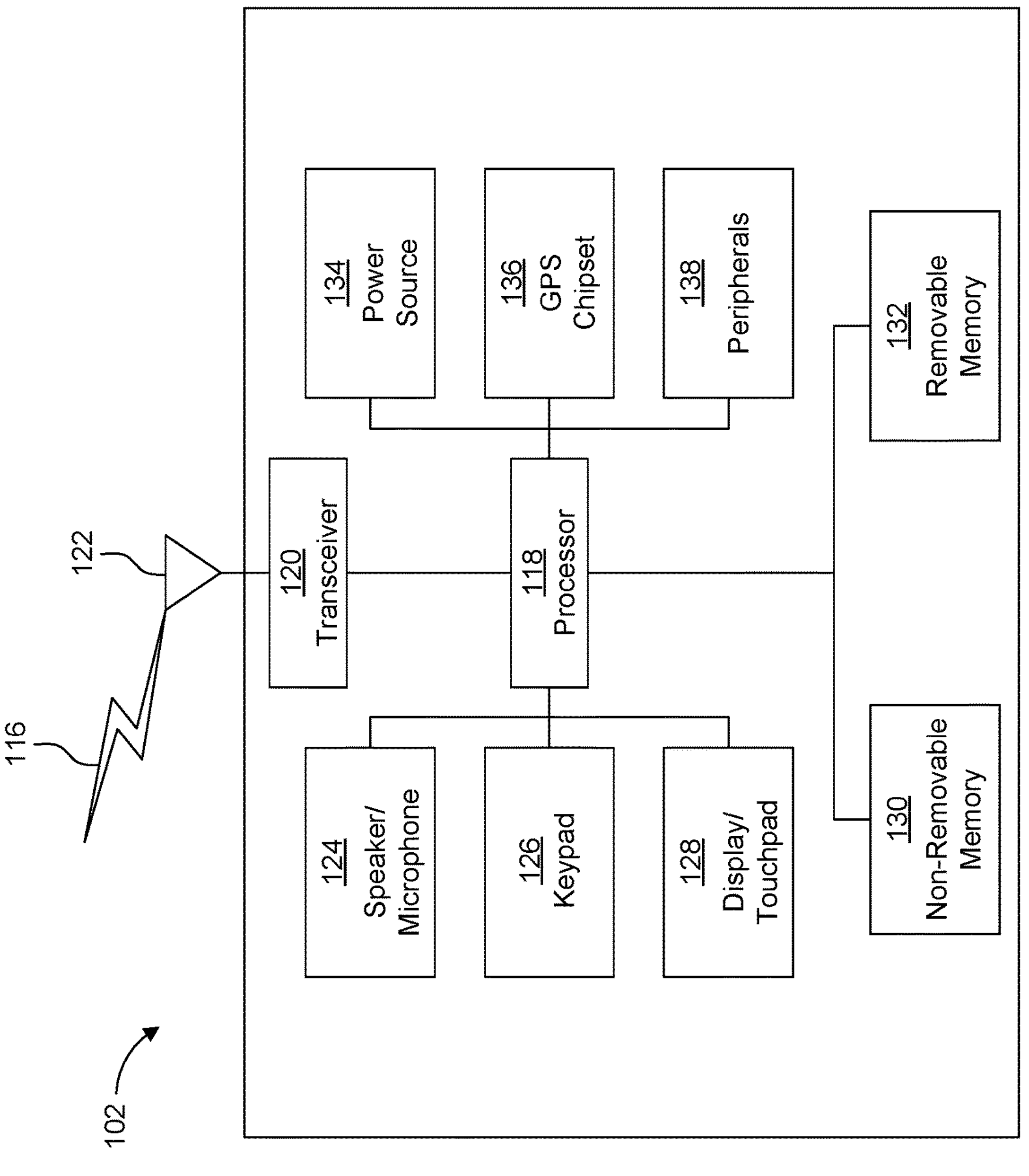
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
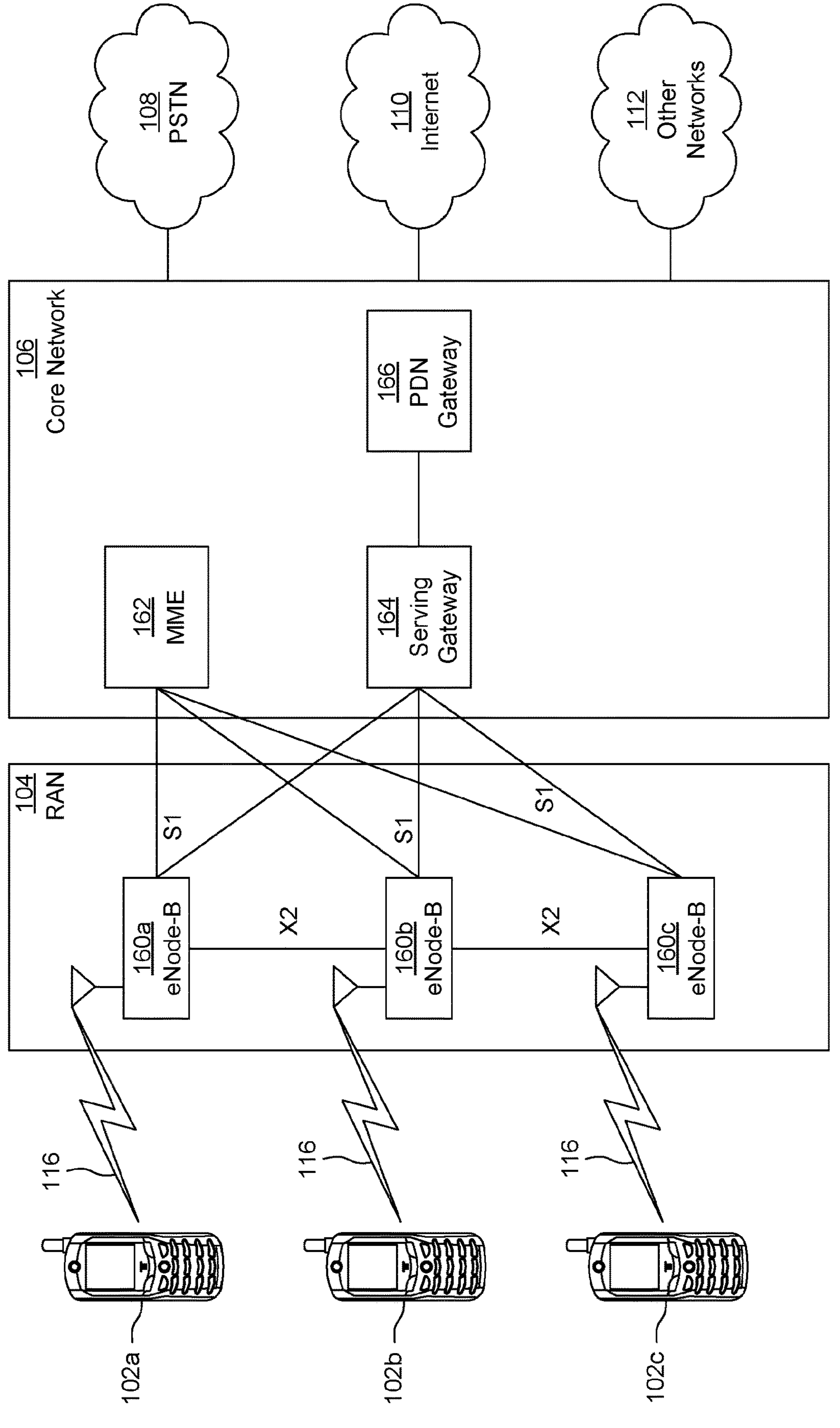
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
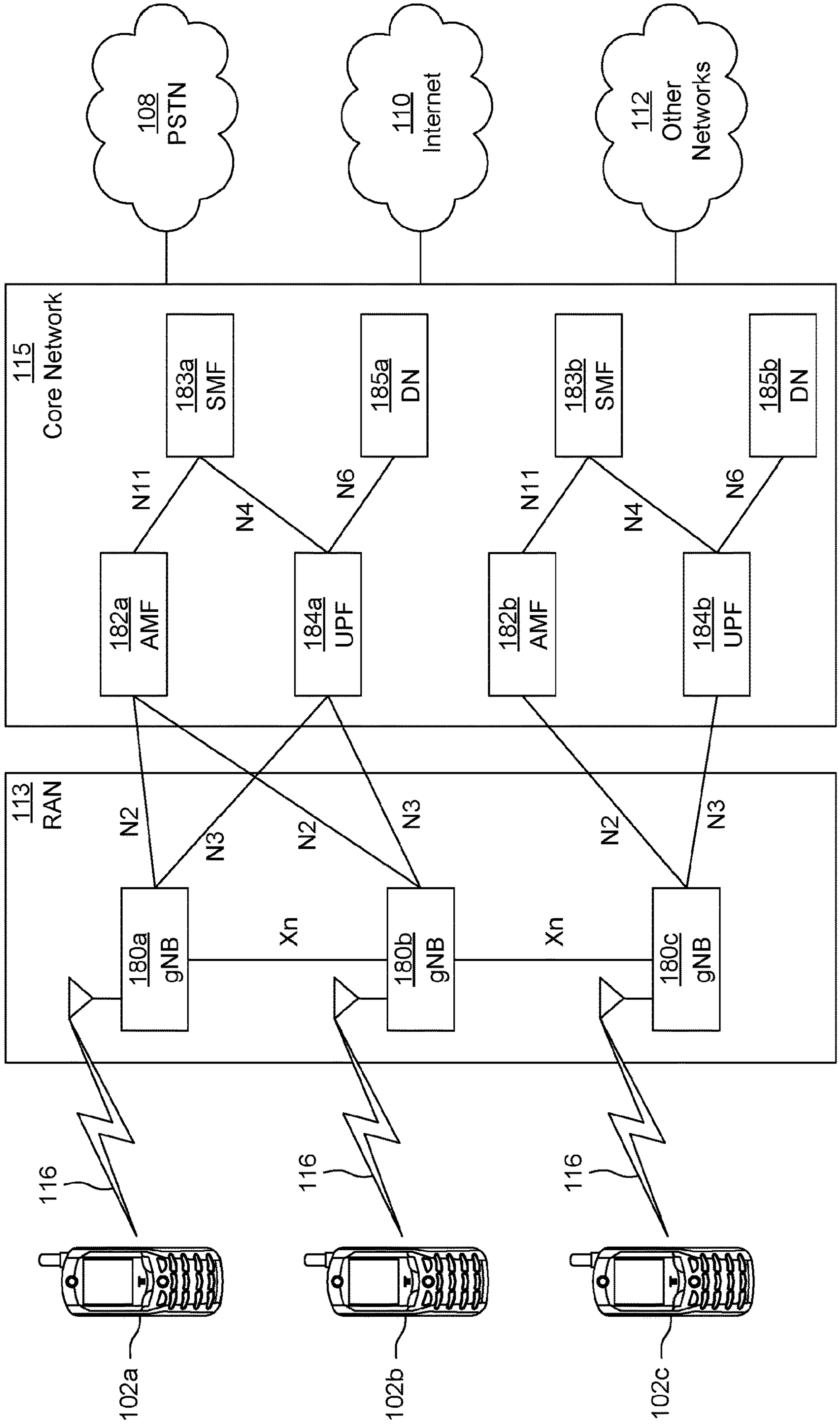
FIG. 1D is a system diagram illustrating a further example RAN and a further example of a CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements is depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized by WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184*a*, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-ab*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In embodiments described herein, a 5G/NR network, a 5G/NR core network, (collectively 5G network) may represent any set of interconnected network entities including a 5G/NR function.

Example of Provisioning Domains

According to embodiments, provisioning domains (PvDs) may allow hosts (e.g., network entities) to attach to multiple networks e.g., simultaneously. PvDs may enable separation of, for example, domain name system (DNS) caches. PvDs may enable configuration consistency (e.g., of a WTRU) in the presence of any number of (e.g., concurrent) connections. For example, PvD-aware applications (e.g., running on a WTRU) may learn (e.g., receive information) about available PvDs and may select a PvD for a communication, based on any of a PvD identifier (ID) and PvD attributes. For example, a WTRU may include an instance of a local service that may have previously used any a PvD ID and a PvD attribute. The WTRU may select a local network among others based on any of the previously used PvD ID and attribute (e.g., the selected PvD ID/attribute being the same as the previously used PvD ID/attribute).

According to embodiments, PvDs may use a combination of router advertisements and hypertext transmission protocol (HTTP) exchanges. For example, PvDs may be based on a (e.g., pre-existing) protocol data unit (PDU) session. Embodiments described herein may allow to provide PvDs to a WTRU in a 5G network prior to connection establishment.

According to embodiments, a PvD may be a (e.g., consistent) set of network configuration information elements representing a network that, for example, a router may give access to. PvDs may include, for example, an identifier (ID) and attributes, which may be visible to a WTRU (e.g., application). According to embodiments, any of a PvD ID and a PvD attribute may be used by a WTRU (application) to select an (e.g., appropriate) PvD. For example, on a (e.g., PvD-aware) WTRU, a listening (e.g., client) socket, e.g., opened by a WTRU application may be associated with a PvD ID, and the WTRU may use, for the corresponding connection, local resources linked to that PvD, such as e.g. any of a DNS server, a DNS cache, a network interface, a source IP address, a next hop router, etc. A "DNS server" may be referred to herein as, for example, a DNS recursive resolver, and more generally as an entry point (first hop) into the DNS system for the WTRU. The terms "DNS server" and "DNS resolver" may be used interchangeably to designate this entry point.

According to embodiments, a PvD ID may (e.g., globally, uniquely) identify a PvD, for example, through hierarchical means, such as a fully qualified name (FQDN). For example, a PvD ID may be a statistically unique ID, such as e.g. a universal unique identifier (UUID). According to embodiments, (e.g., explicit) PvDs may be advertised by the network. According to embodiments, to handle non-PvD aware networks, a WTRU may create an implicit PvD, e.g. on a network interface basis. For example, in IPv6 networks a router may advertise PvD IDs to a WTRU using IPv6 router advertisements, and the rest of the PvD descriptor (e.g., attributes) may be fetched (e.g., retrieved) as a JavaScript object notation (JSON) object by the WTRU using (e.g., secure) HTTP. On a (e.g., PvD-aware) WTRU, (e.g., all) operations related to one connection (e.g., socket), including any of DNS requests, caching, and interfaces used to send/receive packets, may be associated with a PvD. For example, cached DNS records may not be reused between different PvDs. For example, in a multipath context, (e.g., all) operations on (e.g., each) individual path connection may be associated with a PvD, which may be different for (e.g., each) path connection.

FIG. 2A and FIG. 2B are examples of JSON objects representing PvD attributes. Some attributes such as the PvD ID and the DNS server IP address, may be included in router advertisements, and are not present in the JSON objects of FIG. 2A and FIG. 2B.

FIG. 2A illustrates a first example of a JSON object representing access to a local edge cloud network PvD.

FIG. 2B illustrates a second example of a JSON object representing a metered connection protected by a captive portal.

Example of a PvD Aware Use Case

For example, a WTRU user may play a video game (e.g., a WTRU application) that may discover and may make use of local edge services (e.g. any of a WTRU location service, a video stream rendering service, a game application instance at the edge, a local chat relay, etc.). At a given point in time, the WTRU may access multiple remote and local data networks (e.g. micro datacenters) through multiple IP routers beyond multiple wireless access points. While the video game WTRU application may connect to any of the multiple micro-datacenter, the application logic may select one micro-datacenter in particular. For example, the application may prefer connecting to local networks associated with attributes that were associated with local networks, e.g., already used by the application in the past, which may help getting in touch with the same group of players, or get access to a specific set of features or services. Examples of attributes associated with a local network may include any of an operator, a brand name, a domain name, etc.

According to embodiments, 5G networks may control the selection of access points and routers (e.g. UPFs) for WTRU communication. For example, a WTRU may select network parameters to use in PDU sessions (e.g., including any of a data network name (DNN), a network slice, a PDU session type, an access type, etc.) based on route selection policy (URSP) rules. Application providers may, for example, influence the configuration of URSP rules to (e.g., force a WTRU to) select those network parameters (e.g., to use in PDU sessions) for their WTRU application. For example, an application function (AF) may provision parameters through any of the NEF and the PCF. In another example, a service level agreement may determine parameters to be provisioned (e.g., in which case configuration may be done through O&M by the network operator).

In the Internet, PvDs may be used to expose PvD attributes to WTRU applications, enabling the WTRU applications to (e.g., actively) participate in selecting the network they connect to. The network selection may be based on any application logic taking network specific or application specific labels into account (e.g. any of a server label, a domain name, etc. advertised as PvD attribute). Embodiments described herein may enable a granular, flexible and non-5G specific standard way for WTRU applications to select 5G network parameters to use in PDU sessions. Conveying PvDs to WTRUs, by, for example, using IPv6 router advertisements (e.g. which may be sent by SMF in a 5G network), may provide PvDs to the WTRU after the PDU session may have been established, and may not allow the WTRU to derive (e.g., 5G network) parameters for initiating the PDU session from the PvD. Embodiments described herein may allow 5G core network functions (e.g., any of AMF, SMF) to make PvDs available to WTRUs and PvD-aware WTRU applications, prior to PDU session establishment. Embodiments described herein may enable a WTRU to influence the selection of network parameters, such as, for example, the data network access identifier (DNAI). Embodiments described herein may allow third party providers to select the (e.g., most suitable) location to deliver services, based on a particular application, (e.g., despite information on DNAI may not be available to the WTRU).

According to embodiments, a network entity running a policy control function (PCF), may send at least one WTRU route selection policy (URSP) rule associated with, for example, PvD descriptors, to a WTRU. For example, URSP rules and PvD descriptors may (e.g., originally) be configured on any of the unified data management function (UDM) and the unified data repository function (UDR). URSP rules may be configured e.g., as part of the subscription profile and PvD descriptors may be configured e.g., as part of a network-wide configuration. An application function (AF) may use a network exposure function (NEF) application programming interface (API) to access and, for example, update, e.g. through any of NEF and PCF, any of URSP rules and PvD descriptors. According to embodiments, a WTRU may participate in DNAI selection by including a PvD ID in, for example, PDU session establishment messages.

According to embodiments, PCF may be used to convey (e.g., transmit), for example, through AMF, PvD information to a WTRU, e.g. in association with URSP rules (including additional PvD ID information elements). According to embodiments, the WTRU may (e.g., locally) create PvD representations based on information received from the PCF. For example, a WTRU application may select (and e.g., re-select upon WTRU relocation) a (e.g., specific) URSP rule based on a PvD ID, which may enable selecting any of a DNN, a network slice ID, a PDU session type, an access type, a session and service continuity (SSC) mode, and a non-seamless offload indication, in e.g., a non-5G-specific manner. According to embodiments, a PDU session establishment request may include an information element indicating a PvD ID, enabling a WTRU application to influence the DNAI selection. Including a PvD ID information element in a PDU session establishment request may allow a 5G core network function (e.g., such as any of AMF and SMF) to use the PvD ID in the PDU session establishment procedure, e.g. for selecting any of DNAI, SMF, UPF.

According to embodiments, after a PDU session may be established, any of PDU session modifications (e.g., in SSC mode 3), release and replacement with a new PDU session (e.g., in SSC mode 2) may be started (e.g., triggered). For example, this may correspond to a change of DNAI. For example, after a WTRU relocation, PCF may (e.g., trigger to) update any of the URSP rules and the PvD descriptors on the WTRU. The update may include rules associated with any of additional (e.g., new) DNAIs and local area data networks (LADNs). For example, the WTRU may communicate this modification to a PvD-aware WTRU (e.g., application), e.g., as a change of PvD. For example, the WTRU (e.g., application) may select a (e.g., new, different) PvD to discover and communicate with any of the same and a new local service instance through a (e.g., new, different) DNAI.

Figure 3:
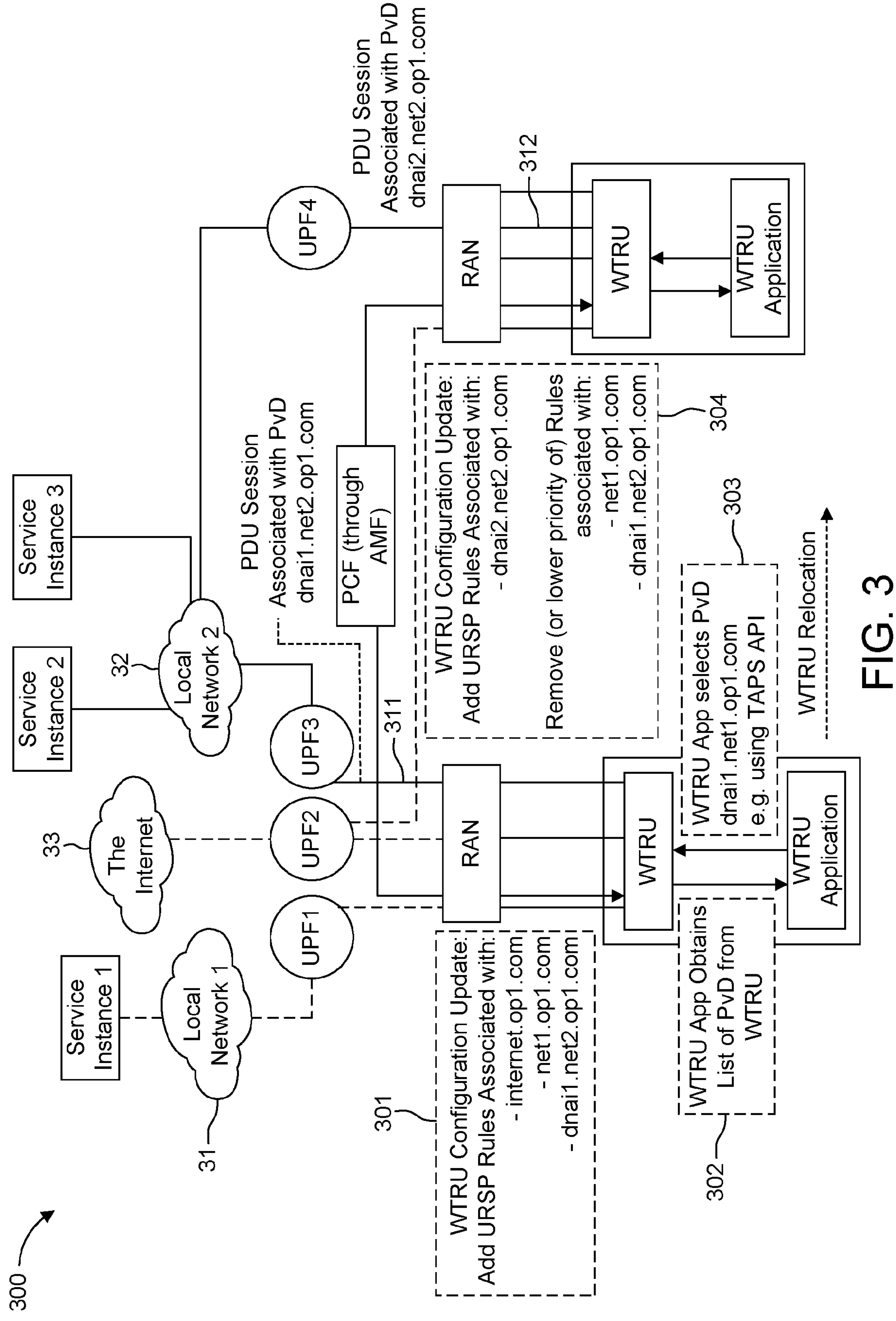
FIG. 3 is a diagram illustrating an example of a PvD support in a 5G architecture.

FIG. 3 is a diagram illustrating an example of a PvD support in a 5G architecture 300. A 5G network operator domain may be referred to herein as “op1.com”. Referring to FIG. 3 a first local network 31 may be accessible via a first user plane function UPF1, and a second local network 32 may be accessible via any of a third user plane function UPF3 and a fourth user plane function UPF4. For example, the third user plane function UPF3 may correspond to a first DNAI, which may be referred to herein as DNAI1 and the fourth user plane function UPF4 may correspond to a second DNAI, which may be referred to herein as DNAI2. For example, the WTRU may be initially located at a first site, which may be in the service area of both the first and the second local networks 31, 32. For example later, the same WTRU may be located at a second site, which may be in the service area of (e.g., only) the second local network 32.

According to embodiments, in a step 301, PCF may provide URSP rules to a WTRU located at the first site. The URSP rules may include any of PvD IDs and related PvD attributes associated with any of the first 31, the second 32 local networks, and other networks 33 (e.g. Internet). For example, the PvD associated with the second local network 32 may be referred to herein as “dnai1.net2.op1.com”, (e.g., the PvD may be associated with a specific DNAI to access the second local network 32). Additionally, although not represented, any number of PvDs may be associated with the second local network 32, with e.g., different values for any of the access type, the SSC mode, the network slice, the PDU session mode (e.g. unstructured, IP, Ethernet), etc.). For example, an URSP rule may include different PvD IDs (e.g., associated) with a same local network DNN and different values for any of access type, SSC mode, etc. According to embodiments, in a step 302, the WTRU application may obtain (e.g., a list, a set of) PvDs from the WTRU. According to embodiments, in a step 303, the WTRU application may select any number of PvDs for communication. The WTRU may send a request to establish a first PDU session 311. For example, the first PDU session 311 may be associated with any of a DNN, SSC mode, an access type, a network slice, a PDU session type corresponding to (e.g., derived from) a selected URSP rule. The URSP rule may be selected based on a selected PvD. In a variant, the request to establish the first PDU session 311 may include a PvD ID to influence DNAI selection by the network.

According to embodiments, after the WTRU may be related at e.g., a second site. In a step 304, the WTRU may obtain any of updated URSP rules and updated PvD information, e.g., from PCF through AMF. For example, the WTRU may notify (e.g., send an indication to) the WTRU application indicating which PvDs may have been added/removed/modified. The WTRU application, for example, using any application logic, may select a new PvD based on PvD attributes for continuing communication, which may correspond to a new URSP rule and a (e.g., new) PDU session 312 may be established. The WTRU application may, for example, discover service instances over this new PDU session 312.

Example of Deployment and Update of PvD Information in 5G Systems

According to embodiments, PvDs may be deployed on WTRUs by e.g. PCF through (e.g., transmission of) URSP rules. URSP rules associated with PvDs may be any of added, updated and removed in the WTRU, for example, after (e.g., upon) a relocation of the WTRU. For example, any of a URSP rule addition, update and removal may be performed by transmitting to the WTRU a (e.g., configuration) message comprising information indicating any of an addition, an update and a removal of an URSP rule. Any of a URSP rule addition, update and removal may enable a WTRU (e.g., application) to select a (e.g., new, different) PvD, corresponding to a (e.g., new, different) DNAI, to communicate with any of the same and a different service instance on any of the same and a different DN.

Table 1 describes an example of a URSP rule, including a PvD ID information element. According to embodiments, the URSP rule may include the PvD ID information element in any of the traffic descriptor section and the route selection section.

According to embodiments, a PvD ID included in the traffic descriptor section may indicate that the WTRU may select a URSP rule based on the PvD ID. For example, a WTRU application may request connectivity associated with a PvD ID, and a URSP rule including a PvD ID in the traffic descriptor matching the requested PvD ID may be selected.

According to embodiments, a PvD ID included in the route selection section may indicate the characteristics of a PDU session corresponding to a URSP rule. For example, after having selected an URSP rule, the WTRU may determine the characteristics of the PDU session (e.g., to establish) based on parameter values e.g. retrieved from the route selection section. The WTRU may set the PvD ID (e.g., obtained from the route selection section) in the PDU session establishment request as described herein.

According to embodiments, a PvD ID may be included in any of one and both sections.

TABLE 1

| Example of an URSP rule including a PvD ID<br>WTRU Route Selection Policy Rule |
|---|
| Rule Precedence |
| Traffic descriptor component comprising: |
| Application descriptors |
| IP descriptors |
| Domain descriptors |
| Non-IP descriptors |
| DNN |
| Connection Capabilities |
| PvD identifier |
| List of Route Selection Descriptors including one or more: |
| Route Selection Descriptor comprising: |
| Route Selection Descriptor Precedence |
| One or more Route selection components comprising at least one of: |
| SSC Mode Selection |
| Network Slice Selection |
| DNN Selection |
| PDU Session Type Selection |
| Non-Seamless Offload indication |
| Access Type preference |
| PvD identifier |
| Route Selection Validation Criteria comprising |
| Time Window |
| Location Criteria |

Table 2 describes an example of a PvD descriptor, that may be included in any of UDM and UDR. For example, sets of PvD descriptors may be part of the 5G network configuration. A (e.g., set of) PvD descriptor may be configured by the network operator on any of UDM and UDR of any network entity, by any of the PCF, AMF and SMF. A PvD descriptor may include any of PvD IDs, PvD attributes, and a mapping to DNAIs. For example, PvD IDs and PvD attributes may be exposed (e.g., available accessible) to WTRUs and mapping to DNAIs may remain internal to the 5G core network (e.g., not available to WTRUs), as described herein. In another example, any of PvD IDs, PvD attributes and mapping(s) to DNAI(s) may be exposed (e.g., available accessible) to WTRUs. For example, PvD descriptors may be the same for any number of (e.g., all) WTRUs. For example, a PvD descriptor may (e.g., only) depend on any of DNNs, DNAIs, and other network parameters. In another example PvD descriptors may be specific to a WTRU or to a group of WTRUs. For example, an AF may determine PvDs with (e.g. a set of different) attributes applicable to e.g. a group of any number of WTRUs (e.g., each WTRU in the group having the same set of attributes). This may allow the AF to tailor (e.g., adapt, adjust) PvD attributes based on various services and features of (e.g., subscribed by) the WTRUs. For example, PvD descriptors may be stored on UDR in a data structure using PvD ID as key. Subscription profiles and URSP rules may include PvD IDs, e.g., for referring to this data structure.

According to an embodiment, there may be no mapping (e.g., association) between PvD(s) and DNAI(s). A WTRU may send a PDU session establishment request without including any PvD ID, and a PvD ID-DNAI mapping (e.g., association) information may not be used by any of AMF and SMF.

TABLE 2

| Example of a PvD descriptor e.g., in UDR/UDM.<br>PvD Descriptor |
|---|
| PvD ID |
| List of associated DNAIs |
| Zero or more other PvD attributes |
| (e.g. well-known or new attributes) |
| Name |
| localized Name |
| Expires |
| dnsZones |
| characteristics |
| noInternet |
| metered |
| captive PortalURL |

Figure 4:
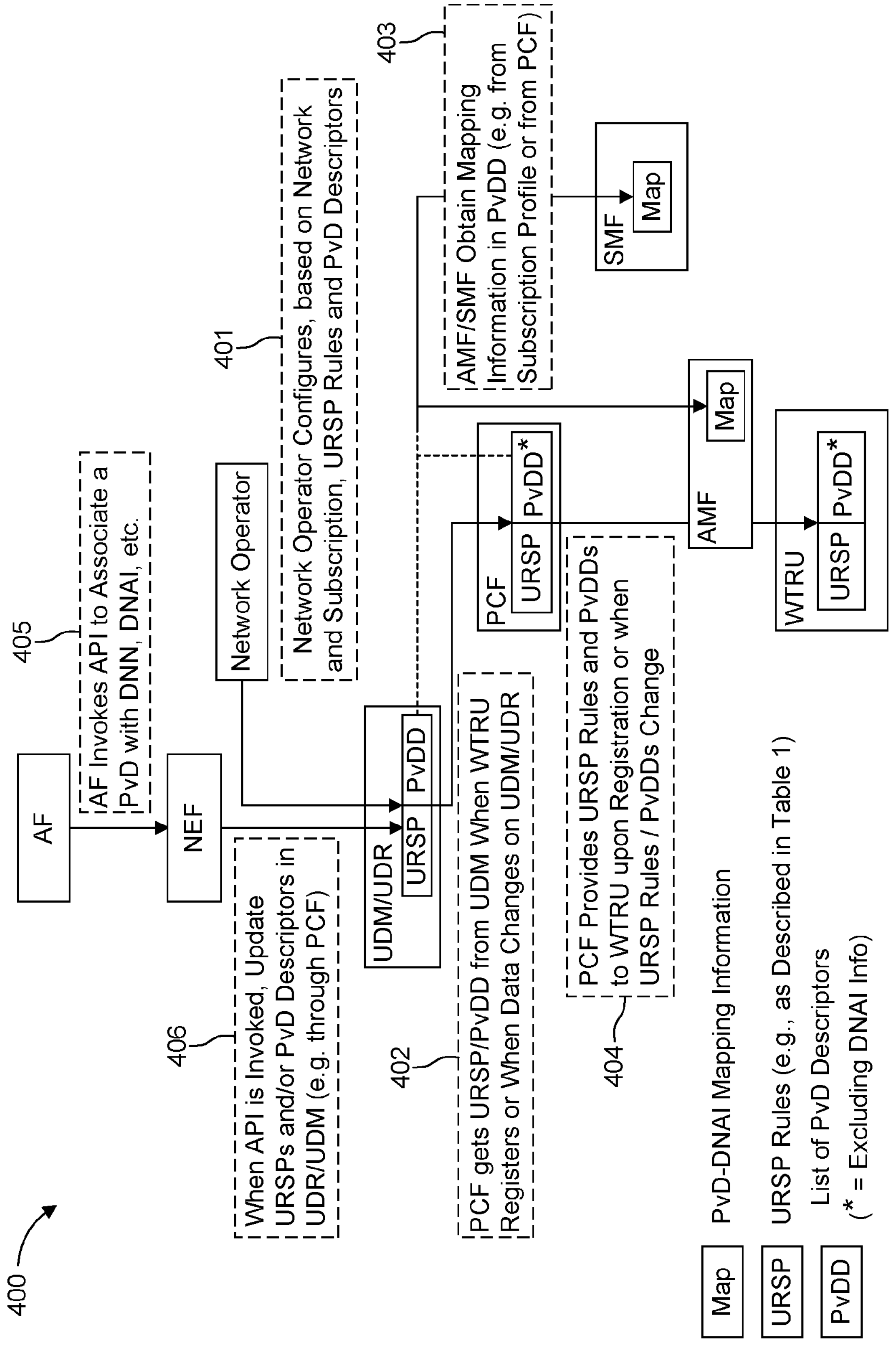
FIG. 4 is a diagram illustrating an example of a deployment of PvD information in a 5G network.

FIG. 4 is a diagram illustrating an example of a method 400 for a deployment of PvD information in a 5G network. FIG. 4 describes provisioning and configuration steps that may lead to the deployment of URSP rules, (e.g., list of) PvD descriptors and DNAI-PvD mapping information in the 5G network.

According to embodiments, the deployment of PvD information in a 5G core network may involve any number of network entities, e.g., at different times. For example, long term storage and maintenance of any of URSP rules and PvD descriptors may be performed on any of UDM and UDR (e.g. stored on UDR and managed by UDM, collectively referred to as UDR/UDM), where they may be configured by e.g., a network operator. According to embodiments, an AF may modify some of this data, for example, via a NEF API. According to different embodiments, this data may be transferred on (e.g., transmitted to) any of PCF, SMF, AMF, and WTRU (e.g., through PCF).

According to embodiments, in a step 401, a network operator may configure any of a URSP rule and PvD descriptors on UDR/UDM. For example, part of this configuration may depend on (e.g., external) data networks and interconnection points (e.g. PvD descriptors may be set based on the location and nature of data networks and DNAIs). For example, other parts of this configuration, such as e.g., the URSP rules, may (e.g., also) depend on user subscription. For example, the PvD ID to associate with a given URSP rule may depend on the services (e.g., currently) subscribed by the WTRU, which may recommend certain attributes to be set in PvDs. A network operator may update any of URSP rules and PvD descriptors during network operation, for example, in case a change is made in a user subscription. In another example, any of URSP rules and PvD descriptors may be updated in case any of a DN and a DNAI is deployed or removed from the network.

According to embodiments, in a step 402, the PCF may obtain any of URSP rules and (e.g., filtered) PvD descriptors, e.g., from UDR/UDM, after, for example, a WTRU registered with the network. In a second example, the PCF may obtain any of the URSP rules and PvD descriptors, after any of the URSP rules and PvD descriptors changed (e.g., after WTRU registration). For example, any message able to transfer URSP rules from UDR/UDM to PCF (e.g., Nudr_DM_Notify notification message) may be used to transport any of URSP rules (e.g., as described in Table 1) and PvD descriptor (e.g., as described in Table 2) from UDR/UDM to PCF. According to embodiments, PvD descriptors (e.g., as described in Table 2) may be, for example, filtered by removing (e.g., filtering out) any associated DNAIs. Filtering a PvD descriptor may allow to hide network operation details to users (make the DNAI not visible to the WTRU), for e.g., security and competitive reasons. For example, outside of UDR/UDM, PvD descriptors may have DNAI information filtered out. In another example, PvD descriptors including associated DNAIs may be received by the WTRU (with e.g., unfiltered DNAIs information). PvD descriptors and filtered PvD descriptors (e.g., with or without DNAI information) may be referred to herein collectively as PvD descriptors.

According to embodiments, in a step 403, any of AMF (e.g. during WTRU registration) and SMF (e.g. at PDU session establishment time) may obtain DNAI-PvD mapping information from any of UDR/UDM (e.g. along with subscription profile) and PCF (e.g. along with policy information). Any of AMF and SMF may determine, based on a PvD ID included in a PDU session establishment request, candidate DNAI(s) for this PDU session, which may guide any of SMF selection by AMF, and UPF selection by SMF.

According to embodiments, in a step 404, URSP rules may be transferred (e.g., transmitted) from PCF to the WTRU, for example, during the 5G WTRU registration procedure, e.g. using a WTRU configuration update procedure. According to embodiments, messages of any WTRU update procedure (e.g., such as the WTRU configuration update procedure for transparent WTRU policy delivery) may include (e.g., additional) information element for transferring any of URSP rules (e.g., as described in Table 1) and PvD descriptors (PvDDs).

According to embodiments, in a step 405, an AF may invoke an API for associating a PvD with any of a DNN, a DNAI, a SSC mode, a network slice ID (e.g. S-NSSAI), an IP selector, domains, application IDs, a PDU session type, a non-seamless offload indication, an access type, a WTRU ID, and a WTRU group ID. In one example, the AF may obtain PvD (e.g., information) from a router advertisement and associated parameters from information elements in the PvD (e.g., information). In another example, a service provider may configure any number of PvDs and associated parameters in the AF.

According to embodiments, in a step 406, the NEF may perform an action corresponding to the operation requested by the AF via the API in the step 405. According to embodiments, the NEF may communicate to any number of network entities, such as any of PCF, UDR/UDM, to perform the requested operations. According to embodiments, updates of any of URSP rules and PvD descriptors may be stored in UDR/UDM.

According to embodiments, an AF may invoke a NEF API, which may be referred to herein as "PvD association API". An example of the PvD association API is described in Table 3. For example, any of PCF and UDM/UDR may (e.g., also directly) expose this API to (e.g., trusted) AFs. According to embodiments, the caller entity may request to associate a PvD with any number of associated parameters such as any of a SSC mode, a network slice ID (e.g. single network slice selection assistance information (S-NSSAI)), a DNN, an IP selector, domains, application IDs, a PDU session type, a non-seamless offload indication, an access type, a WTRU ID (e.g. generic public subscription identifier (GPSI)), a WTRU group ID, a DNAI. According to embodiments, any of PCF and UDM/UDR may obtain (e.g., look up) URSP rules including an associated parameter in any of a traffic descriptor component and a route selection component, or may create new URSP rules including associated parameters, and may update the (e.g., matching or created) rules by setting the value of the PvD ID component (in any of traffic descriptor and route selection component, depending on the API request) of the URSP rule to the requested PvD ID value.

According to embodiments, an AF may invoke a NEF API, which may be referred to herein as "PvD configuration API". An example of the PvD configuration API is described in Table 3. For example, UDM/UDR may (e.g., also directly) expose this API to (e.g., trusted) AFs. According to embodiments, the caller entity may any of create a PvD, delete a PvD, get and set PvD attributes for a (e.g., given) PvD. The PvD configuration API may allow a (e.g., 3rd party) network provider managing a (LA)DN to modify PvD attributes and to make the modified PvD attributes available to WTRU applications.

TABLE 3

| Example of PvD association and configuration APIs.<br>PvD association API exemplary operation |
|---|
| Service operation name: PvDAssociationCreate<br>Description: Authorize the request and forward the request for PvD association<br>Inputs: AF Transaction Id (that may be used in other operations such as delete, update, etc. to refer to the request), PvD ID, one or more association parameters, among: SSC mode, network slice ID (e.g. S-NSSAI), DNN, IP selector, domains, application IDs, PDU session type, non-seamless offload indication, access type, WTRU ID (e.g. GPSI), WTRU group ID, DNAI<br>Action: modification of URSP rules that match the inputs parameters, in UDR/UDM and, if the WTRU is registered, propagation of the update into PCF and WTRU.<br>Outputs: operation execution result indication.<br>Outputs (optional): number of URSP rules modified.<br>(Other PvD association API operations may include, e.g. PvDAssociationDelete to delete an existing association using the AF Transaction ID as key, PvDAssociationUpdate to modify an existing association using the AF Transaction ID as key) |
| PvD configuration API exemplary operation 1 |
| Service operation name: PvDGet<br>Description: Return PvD attributes<br>Inputs: PvD ID<br>Action: returns attributes of a PvD<br>Outputs: a representation of the PvD attributes (e.g. in JSON format) |
| PvD configuration API exemplary operation 2 |
| Service operation name: PvDSet<br>Description: Modifies PvD attributes<br>Inputs: PvD ID, a representation of the PvD attributes (e.g. in JSON format)<br>Action: modification of an existing PvD descriptor in UDR/UDM, by replacing its PvD attributes with the provided ones. If the WTRU is registered, propagation of the update into PCF and WTRU. The WTRU may send an event to WTRU applications that may be listening to PvD update events. |

TABLE 3-continued

| Example of PvD association and configuration APIs. PvD association API exemplary operation |
|---|
| Outputs: operation execution result indication (Other PvD configuration API operations may include, e.g. PvDUpdate to update an existing PvD to add/remove/update attributes, PvDCreate to create a new PvD) |

According to embodiments, after having been provided with any of URSP rules and PvD descriptors (e.g., updates) in the step 404, a WTRU may create a local representation of PvDs based on the received PvD descriptors. For example, the WTRU may expose PvDs to WTRU applications, based on the (e.g., applicable) URSP rules. For example, a WTRU application may request (e.g., a list of) available PvDs. The WTRU may, in this example, return (e.g., a list of all) PvD IDs which may be included in the traffic descriptor component of at least one URSP rule applicable to this application (e.g. all URSP rules including this WTRU application ID). For example, the WTRU application may retrieve from the WTRU the PvD attributes for (e.g., each one of) the returned PvD IDs, e.g. using a local programmatic API. For example, the WTRU application may select any number of PvDs based on PvD attributes and may communicate selected PvDs to the WTRU. In a first example, the WTRU application may open a socket associated with a PvD ID (e.g. using a Transport Services (TAPS) API). In a second example, the WTRU application may use a (e.g., modified) gethostbyname( )function call (e.g., modified to accept a PvD ID as parameter). The WTRU may select the appropriate URSP rule for this connection based on the PvD selected by the WTRU application. For example, there may be more than one matching URSP rule that may differ by their PvD ID. For example, the WTRU may select the highest priority URSP rule that may be associated with the provided PvD. Any technique for selecting a URSP rule among matching URSP rules with different PvD IDs may be applicable to the embodiments described herein.

According to embodiments, the WTRU may transmit a PDU session establishment request message including an information element indicating a PvD ID. In a first example, the WTRU application may select a PvD (e.g., identified by a PvD ID) for a connection, and the PvD ID included in the PDU session establishment request message may be set to the selected PvD ID. In a second example, a selected URSP rule may include a PvD ID in its route selection descriptor component, and the PvD ID included in the PDU session establishment request message may be set to the PvD ID of the route selection descriptor component. According to embodiments, the 5G network (e.g. any of AMF, SMF) may select a DNAI based on the PvD ID included in the PDU session establishment request, for example, after referring to a DNAI-PvD ID mapping table, e.g. obtained from the PvD descriptors (as described in Table 2), from the 5G network configuration. Including a PvD ID information element in a PDU session establishment request may allow to enable a WTRU(s) to select a DNAI or set of DNAIs, for example, without exposing detailed DNAI information to the WTRU.

According to embodiments, a WTRU may learn (e.g., receive, be indicated of) other PvDs by other means, e.g. based on router advertisements (RA) sent by routers over links not managed by the 5G operator (e.g. fixed or WiFi links). For example, these PvDs may be exposed (e.g., made available) to WTRU applications along with e.g., PCF-originated PvDs. This may allow a WTRU application to select between a 5G-based and non-5G-based access, for example, based on an application logic.

Figure 5:
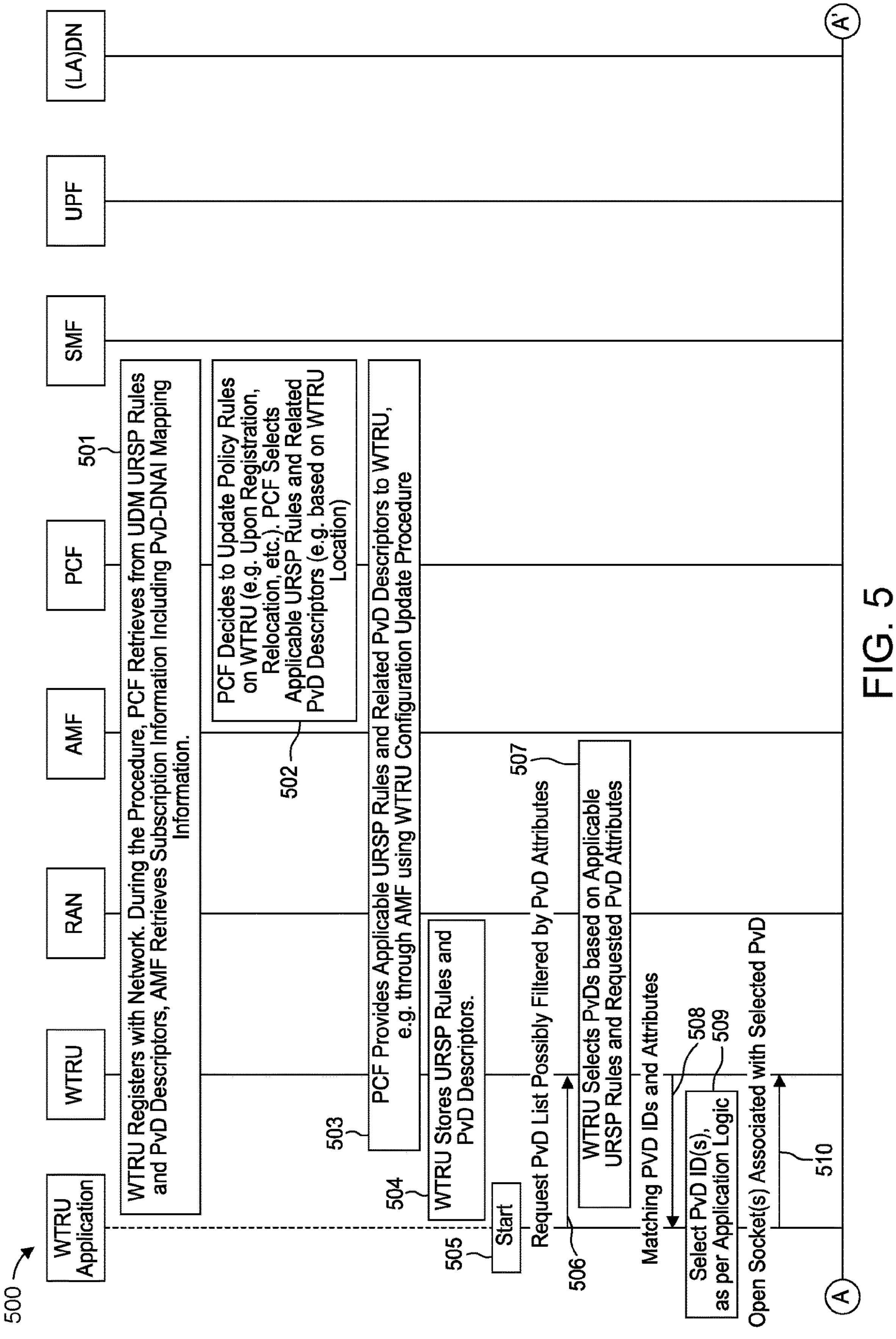
FIG. 5 is a diagram illustrating an example of a method for supporting provisioning domains in a 5G network.
Figure 5:
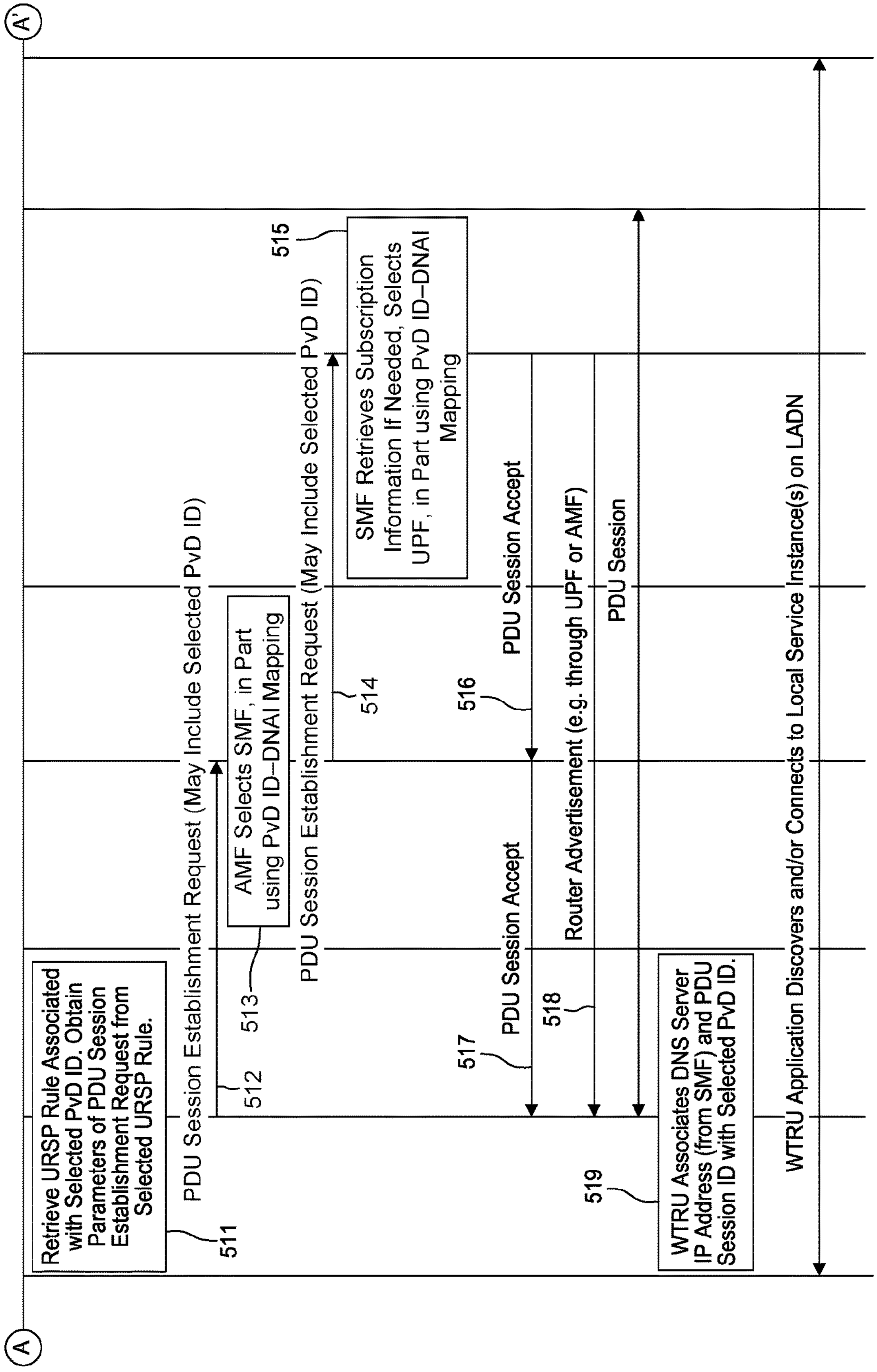

FIG. 5 is a diagram illustrating an example of a method 500 for supporting provisioning domain in a 5G network. According to embodiments, a PvD aware WTRU application may be enabled to initiate new connections based on, for example, application logic and PvD attributes. FIG. 5 illustrates 5G support for PvD (e.g., enabling PvDs to be made available to the WTRUs prior to PDU session establishment) and PvD-DNAI mapping (e.g., enabling a WTRU (e.g., application) to influence DNAI selection). In a variant (not illustrated) 5G support for PvD may be deployed without PvD-DNAI mapping (e.g., association) mechanism. According to embodiments the method 500, as illustrated in FIG. 5 may be used without any PvD-DNAI mapping (e.g., association) information (e.g., in steps 501, 513, 515) and where PvD ID may not be set in PDU session establishment request (e.g., in steps 512, 514).

According to embodiments, in a step 501, a WTRU may register with the 5G network. For example, the PCF may retrieve from UDR/UDM URSP rules (e.g., as described in Table 1) and PvD descriptors (e.g., not including any PvD ID-DNAI mapping). The AMF may retrieve PvD ID-DNAI mapping information from the subscription profile e.g., during the registration process. The PvD ID-DNAI mapping information may, for example, be used in step 513.

According to embodiments, any of PvD IDs and PvD attributes may be set by the network operator, with a range of parameters including any of DNNs, LA DNNs, DNAIs, network slice IDs, access type, SSC mode, etc. For example, any of PvD IDs and PvD attributes may set on a per WTRU basis. In another example, any of PvD IDs and PvD attributes may set on a per group of (e.g., any number of) WTRUs basis. According to embodiments, PvDs (e.g., IDs, attributes) may allow a WTRU (e.g., application) to control the selection of route selection components.

According to embodiments, in a step 502, the PCF may update policy rules on the WTRU (e.g. after any of registration, relocation, etc.). For example, the PCF may select (e.g., applicable) URSP rules (e.g., as described in Table 1) and PvD descriptors (e.g., as described in Table 2). For example, the PCF may receive a notification from UDR/UDM indicating that any of PvD descriptor and URSP rules were modified (e.g. by AF). The PCF may update this information on the WTRU, e.g., after reception of the modification notification.

For example, the PCF may determine which URSP rules (e.g., as described in Table 1) may be transferred to the WTRU, e.g. based on WTRU location.

For example, the PCF may determine which PvD descriptors may be transferred to the WTRU. For example, (e.g. all) PvD descriptors with a PvD ID included in at least one transferred URSP rule (e.g., as described in Table 1) may be transferred to the WTRU.

According to embodiments, in a step 503, the PCF may provide (e.g., applicable) URSP rules and PvD descriptors to the WTRU, e.g. through AMF e.g., using a WTRU configuration update procedure. For example, the WTRU may receive a (e.g., configuration update message) including information indicating any number of (e.g., applicable) URSP rules and PvD descriptors.

According to embodiments, in a step 504, the WTRU may (e.g., locally) store received URSP rules (e.g., as described in Table 1) and PvD descriptors.

According to embodiments, in a step 505, a PvD-aware WTRU application may be started on the WTRU.

According to embodiments, a WTRU may not run any PvD aware application and at least steps 506-509 may be skipped. For example, the WTRU may run applications, among which none may be PvD aware. In another example, the WTRU may run some applications that may be PvD aware, while others may not be PvD aware. For example, a (e.g., non PvD aware) application may skip (e.g., not perform) PvD based selection of an URSP rule. The WTRU may select an URSP rule for establishing connectivity based on any selection technique. In a non-limiting example, the WTRU may select a URSP rule including an application descriptor matching (e.g., parameters of) a WTRU application. The WTRU may obtain the PvD ID, for example, from the selected URSP rule, (e.g., if present) and may establish the PDU session in a step 512, by sending a PDU session establishment message including that PvD ID in the step 512, as described herein. According to embodiments a WTRU (e.g., not running any PvD aware application) may influence (e.g., impact) the DNAI selection by the 5G network based on a PvD ID. For example, an application provider, e.g. through the NEF API described herein, may allow a WTRU to influence the DNAI selection, e.g., despite the WTRU may not include any PvD aware application.

According to embodiments, (e.g., any of a software and a firmware component of) the WTRU may perform PvD selection. For example, communication may be requested (e.g. a socket may be opened). A set (e.g., list) of PvDs may be collected from (e.g., applicable) URSP rules and a PvD ID may be selected for communication, based on PvD attributes processed by the WTRU, e.g., based on any software/firmware component logic. According to embodiments, the WTRU may select a URSP rule based on the selected PvD ID and may transition from step 504 to step 512 (e.g., skipping steps 505-511) for establishing a PDU session in the step 512, based on parameters derived from the selected URSP rule.

According to embodiments, in a step 506, a (e.g., PvD aware) WTRU application may request a list of available PvDs, e.g., based on any application logic. For example, the WTRU application request may include (e.g., a list of) conditions on PvD attributes, e.g. request a (e.g., given) PvD attribute to any of be present, hold a specific value, hold a value different from a specified value, etc.

According to embodiments, in a step 507, The WTRU may select (e.g., all) URSP rules (e.g., as described in Table 1) applicable to this (e.g., PvD aware) WTRU application For example, (e.g. all) URSP rules associated with the ID of the WTRU application may be applicable to the WTRU application. In another example, any URSP rules (e.g., as described in Table 1) with any attribute matching any (one, each, all) attributes requested by the WTRU application, may be applicable to the WTRU application. For example, the WTRU may collect (e.g., all) PvD descriptors which ID may be included in at least one (e.g., applicable) URSP rule. For example, the WTRU may filter the collected PvD descriptors based on any condition included in the WTRU application request (e.g., of step 506).

According to embodiments, in a step 508, the WTRU may return to the WTRU application a (e.g. JSON) representation of (e.g., all) PvDs collected (e.g., and/or filtered) in the step 507.

According to embodiments, in a step 509, the WTRU application may select any number of PvDs for its communications based on, for example, PvD attributes, e.g. using application-specific logic to process PvD attributes.

For example, the WTRU application may select a PvD among (e.g., a set of) different PvDs associated with different attributes (e.g., any of DNNs, LA DNNs, DNAIs, network slice IDs, access type, SSC mode, etc.). For example, a WTRU (e.g.) application may connect (e.g., any of simultaneously and sequentially), based on e.g., local application decision, to different (LA)DNNs, DNAIS, network slices, etc. Embodiments described herein may enable new classes of WTRU application behavior to emerge. Embodiments described herein may allow a WTRU to manage connections of WTRU applications to local service instances at the application layer, allowing applications to e.g. complete existing transactions with an old service instance, and create new transactions with a new service instance, or load balance transactions between multiple instances.

According to embodiments, in a step 510, a WTRU application may open a socket associated with a selected PvD ID. For example, the WTRU application may use (e.g., invoke) a TAPS API for associating a socket opening with a PvD ID. In another example, the WTRU application may use (e.g., invoke) a C API call gethostbyname( )e.g., adapted to include a PvD ID as (e.g., additional) parameter.

According to embodiments, in a step 511, the WTRU may select a URSP rule, based on which a PDU session may be established in the steps 512-519. The URSP rule may be selected based on the selected PvD ID and any other URSP parameters e.g., including any of priority and traffic descriptor parameters (e.g. such as application descriptor, IP descriptor, etc.).

According to embodiments, in steps 512-518, the WTRU may request a PDU session establishment, and the PDU session may be established by the 5G network.

According to embodiments, in a step 512, the WTRU may transmit a PDU session establishment request message that may include an information element indicating a (e.g., selected, requested) PvD ID for requesting the 5G network to select a DNAI associated with the (e.g., selected, requested) PvD ID. Transmission of a PDU session establishment request message without any PvD ID information element may also be applicable to embodiments described herein (in which case the WTRU may not influence the 5G network for the DNAI selection). The PDU session establishment request message (e.g., with or without a selected PVD ID indication) may include parameters (e.g., for establishing the PDU session), that may be derived (e.g., obtained) from the selected URSP rule.

According to embodiments, in a step 513, the AMF may select the SMF based on a PvD ID-DNAI mapping information of a PvD descriptor (e.g. obtained from any of UDR/UDM and PCF). For example, the AMF may select a SMF that may be capable of handing the DNAI(s) mapped to the requested PvD ID.

According to embodiments, in a step 514, the AMF may forward the PDU session establishment request including the requested PvD ID to the selected SMF.

According to embodiments, in a step 515, the SMF may select an UPF based on the PvD ID-DNAI mapping information of the PvD descriptor (e.g. obtained from any of UDR/UDM and PCF). For example, the mapping information may designate one DNAI (e.g., as associated with the requested PvD ID), and the SMF may select an UPF that may be collocated with the DN access point identified by this DNAI.

According to embodiments, in a step 516, a PDU session accept may be transmitted by the SMF to the AMF.

According to embodiments, in a step 517, the PDU session accept may be forwarded by the AMF to the WTRU.

According to embodiments, in a step 518, the WTRU may receive a router advertisement from any of the UPF and the AMF. For example, DNS server information related to the PDU session may be provided to the WTRU, e.g. using an option of the router advertisement sent (e.g., by SMF) to the WTRU. According to embodiments, the PDU session may be (e.g., successfully) established between the WTRU and the UPF (e.g., selected based on the PvD ID-DNAI mapping).

According to embodiments, in a step 519, a DNS server IP address may become available. The WTRU may associate the DNS server IP address with the (e.g., previously selected) PvD ID for this PDU session. For example, the WTRU may (e.g., also) associate the PDU session ID with this PvD ID. According to embodiments, associating a PDU session ID with a PvD ID may allow any (e.g., further) application of the WTRU to select this PvD ID for using the existing PDU session.

According to embodiments, the WTRU may use DNS to discover a service instance on the (LA)DN and communicate with it.

Figure 6:
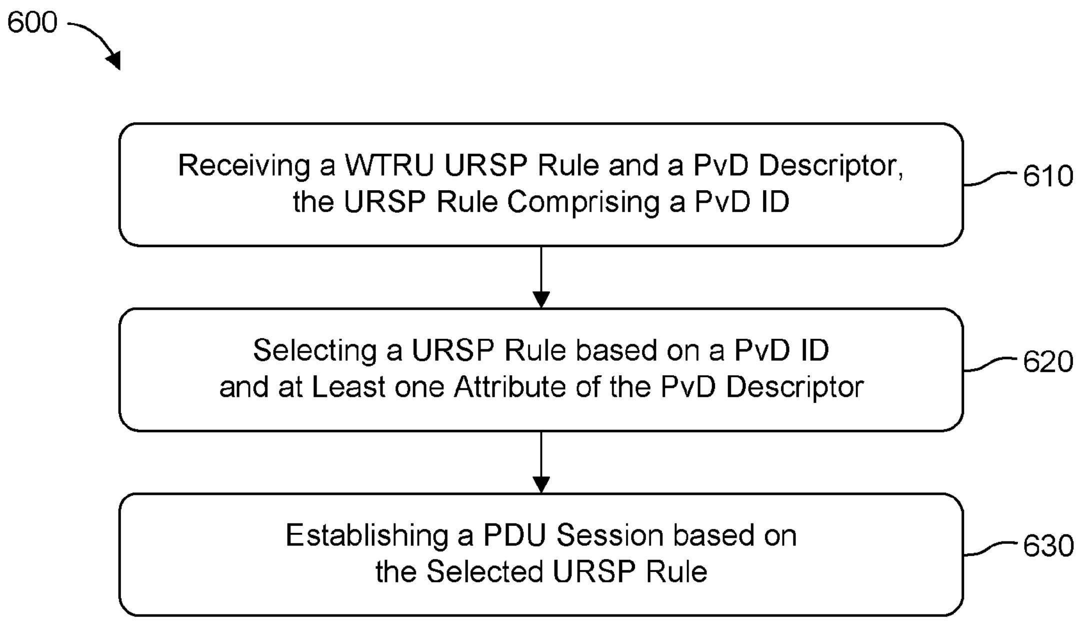
FIG. 6 is a diagram illustrating an example of a method for supporting a PvD in a WTRU.

FIG. 6 is a diagram illustrating an example of a method 600 for supporting a PvD in a WTRU. According to embodiments, in a step 610, a WTRU may receive at least one URSP rule and at least one PvD descriptor, the at least one URSP rule comprising at least one PvD ID. According to embodiments, in a step 620, a WTRU may select one of the at least one URSP rule based on one of the at least one PvD ID and on at least one attribute of the at least one PvD descriptor. For example, the WTRU may select the one of the at least one PvD ID based on a previously used PvD (e.g., the selected PvD ID may identify a PVD that may have been already used (e.g., in the past) by the WTRU). For example, the WTRU may select the one of the at least one PvD ID based on the at least one attribute of the at least one PvD descriptor. For example, the one of the at least one PvD ID may be selected by an application running on the WTRU. For example, the WTRU may influence a selection of a DNAI with which the selected PvD ID may be associated. According to embodiments, in a step 630, a WTRU may establish a PDU session based on the selected URSP rule. For example, the WTRU may transmit a PDU session establishment request message including parameters that may be derived from the selected URSP rule. For example, the PDU session establishment request message may further include the selected PvD ID. For example, the PDU session may be established between the WTRU and an UPF selected based on a DNAI associated with the selected PvD ID. For example, a DNS server (e.g., address) and an identifier of the established PDU session may be associated with the selected PvD ID.

Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

While not explicitly described, the present embodiments may be employed in any combination or sub-combination. For example, the present principles are not limited to the described variants, and any arrangement of variants and embodiments can be used.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as “associated with” each other such that the desired functionality is achieved, irrespective of architectures or intermediate components. Likewise, any two components so associated may also be viewed as being “operably connected”, or “operably coupled”, to each other to achieve the desired functionality, and any two components capable of being so associated may also be viewed as being “operably couplable” to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as “open” terms (e.g., the term “including” should be interpreted as “including but not limited to,” the term “having” should be interpreted as “having at least,” the term “includes” should be interpreted as “includes but is not limited to,” etc.). It will be further understood by those within the art that if a specific number of an introduced claim recitation is intended, such an intent will be explicitly recited in the claim, and in the absence of such recitation no such intent is present. For example, where only one item is intended, the term “single” or similar language may be used. As an aid to understanding, the following appended claims and/or the descriptions herein may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases “one or more” or “at least one” and indefinite articles such as “a” or “an” (e.g., “a” and/or “an” should be interpreted to mean “at least one” or “one or more”). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of “two recitations,” without other modifiers, means at least two recitations, or two or more recitations).

Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.” Further, the terms “any of” followed by a listing of a plurality of items and/or a plurality of categories of items, as used herein, are intended to include “any of,” “any combination of,” “any multiple of,” and/or “any combination of multiples of” the items and/or the categories of items, individually or in conjunction with other items and/or other categories of items. Moreover, as used herein, the term “set” or “group” is intended to include any number of items, including zero. Additionally, as used herein, the term “number” is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as “up to,” “at least,” “greater than,” “less than,” and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms “means for” in any claim is intended to invoke 35 U.S.C. §112, ¶ 6 or means-plus-function claim format, and any claim without the terms “means for” is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

What is claimed is:

1. A method implemented in a wireless transmit/receive unit (WTRU) the method comprising:

receiving configuration information indicating at least one WTRU route selection policy (URSP) rule and at least one provisioning domain descriptor, wherein the at least one URSP rule indicates at least one provisioning domain identifier (PvD ID) of a plurality of PvD IDs;

selecting a PvD ID from the plurality of PvD IDs based on the at least one provisioning domain descriptor, wherein the at least one provisioning domain descriptor comprises at least one attribute of a new or previously used provisioning domain, and wherein selecting the PvD ID comprises selecting the PvD ID based on the at least one attribute of the new or previously used provisioning domain;

transmitting a session establishment request message including information indicating the selected PvD ID; and receiving a session establishment accept message indicating that a session is established between the WTRU and a network function associated with the selected PvD ID.

2. The method of claim 1, wherein selecting the PvD ID comprises selecting the PvD ID by an application running on the WTRU.

3. The method of claim 1, wherein the at least one provisioning domain descriptor indicates a data network access identifier associated with the selected PvD ID.

4. The method of claim 1, wherein the network function associated with the selected PvD ID comprises a user plane function (UPF) collocated with a data network access point identified by a data network access identifier associated with the selected PvD ID.

5. The method according to claim 1, wherein the session establishment request message is for requesting a selection of a data network access identifier associated with the selected PvD ID.

6. A wireless transmit/receive unit (WTRU) comprising circuitry, including any of a transmitter, receiver, processor and memory, the WTRU being configured to:

receive configuration information indicating at least one WTRU route selection policy (URSP) rule and at least one provisioning domain descriptor, wherein the at least one URSP rule indicates at least one provisioning domain identifier (PvD ID) of a plurality of PvD IDs;

select a PvD ID from the plurality of PvD IDs based on the at least one provisioning domain descriptor, wherein the at least one provisioning domain descriptor comprises at least one attribute of a new or previously used provisioning domain, and wherein being configured to select the PvD ID comprises being configured to select the PvD ID based on the at least one attribute of the new or previously used provisioning domain;

transmit a session establishment request message including information indicating the selected PvD ID; and receive a session establishment accept message indicating that a session is established between the WTRU and a network function associated with the selected PvD ID.

7. The WTRU of claim 6, wherein being configured to select the PvD ID comprises being configured to select the PvD ID by an application running on the WTRU.

8. The WTRU of claim 6, wherein the at least one provisioning domain descriptor indicates a data network access identifier associated with the selected PvD ID.

9. The WTRU of claim 6, wherein the network function associated with the selected PvD ID comprises a user plane function (UPF) collocated with a data network access point identified by a data network access identifier associated with the selected PvD ID.

10. The WTRU of claim 6, wherein the session establishment request message is for requesting a selection of a data network access identifier associated with the selected PvD ID.

11. The method of claim 1, wherein the at least one provisioning domain descriptor indicates at least one provisioning domain, and wherein a first provisioning domain is associated with network configuration information to be used for connecting to a network of a plurality of networks.

12. The method of claim 1, wherein the configuration information indicates a plurality of URSP rules and wherein a URSP rule is selected from the plurality of URSP rules based on the selected PvD ID.

13. The method of claim 1, wherein the session establishment request message is a protocol data unit (PDU) session establishment request message.

14. The WTRU of claim 6, wherein the at least one provisioning domain descriptor indicates at least one provisioning domain, and wherein a first provisioning domain is associated with network configuration information to be used for connecting to a network of a plurality of networks.

15. The WTRU of claim 6, wherein the configuration information indicates a plurality of URSP rules and wherein a URSP rule is selected from the plurality of URSP rules based on the selected PvD ID.

16. The WTRU of claim 6, wherein the session establishment request message is a protocol data unit (PDU) session establishment request message.

* * * * *